(12) United States Patent
Mampaey

(10) Patent No.: US 10,958,751 B2
(45) Date of Patent: Mar. 23, 2021

(54) METHOD FOR VERIFYING A USER ASSOCIATION, INTERCEPTING MODULE AND NETWORK NODE ELEMENT

(75) Inventor: Marcel Mampaey, Brussels (BE)

(73) Assignee: Alcatel Lucent, Boulogne-Billancourt (FR)

( * ) Notice: Subject to any disclaimer, the term of this patent is extended or adjusted under 35 U.S.C. 154(b) by 180 days.

(21) Appl. No.: 13/265,772

(22) PCT Filed: Apr. 29, 2010

(86) PCT No.: PCT/EP2010/055840
§ 371 (c)(1),
(2), (4) Date: Nov. 8, 2011

(87) PCT Pub. No.: WO2010/127993
PCT Pub. Date: Nov. 11, 2010

(65) Prior Publication Data
US 2012/0066324 A1   Mar. 15, 2012

(30) Foreign Application Priority Data

May 4, 2009   (EP) .................................... 09305391

(51) Int. Cl.
| | |
|---|---|
| *G06F 15/16* | (2006.01) |
| *H04L 29/08* | (2006.01) |
| *G06Q 10/10* | (2012.01) |
| *H04L 29/06* | (2006.01) |
| *H04L 12/741* | (2013.01) |

(52) U.S. Cl.
CPC ....... *H04L 67/2804* (2013.01); *G06Q 10/107* (2013.01); *H04L 45/74* (2013.01); *H04L 63/0227* (2013.01); *H04L 63/0281* (2013.01); *H04L 63/107* (2013.01); *H04L 63/126* (2013.01); *H04L 67/02* (2013.01); *H04L 67/306* (2013.01); *H04L 67/42* (2013.01); *H04L 63/104* (2013.01); *H04L 67/18* (2013.01)

(58) Field of Classification Search
CPC ..... G06Q 10/107; H04L 12/585; H04L 67/02; H04L 67/42; H04L 67/28; H04L 63/0227; H04L 63/0281; H04L 29/08072; H04L 45/74; H04L 67/2804; H04L 63/126; H04L 67/306; H04L 63/107; H04L 63/104; H04L 67/18; H04W 4/02
USPC .................................................. 709/204–207
See application file for complete search history.

(56) References Cited

U.S. PATENT DOCUMENTS

| | | | |
|---|---|---|---|
| 7,197,556 B1 | 3/2007 | Short et al. | |
| 7,447,775 B1* | 11/2008 | Zhu ................. | H04N 21/23439 709/217 |
| 2001/0044893 A1* | 11/2001 | Skemer .............. | H04L 12/2856 713/153 |

(Continued)

FOREIGN PATENT DOCUMENTS

| | | |
|---|---|---|
| WO | 01 33808 | 5/2001 |
| WO | 03/075496 | 9/2003 |

*Primary Examiner* — Chris Parry
*Assistant Examiner* — Weiwei Y Stiltner
(74) *Attorney, Agent, or Firm* — McCracken & Gillen LLC

(57) ABSTRACT

Method for verifying an association between a user and a group of users sharing a common subscription, comprising intercepting a message between a user and a service provider; adapting the message with information to include a guarantee to the service provider that the message is sent from a location allowed by the common subscription.

12 Claims, 3 Drawing Sheets

(56) References Cited

U.S. PATENT DOCUMENTS

| | | | |
|---|---|---|---|
| 2003/0123488 A1* | 7/2003 | Riikonen | H04L 29/06 370/503 |
| 2003/0212771 A1 | 11/2003 | Kwon | |
| 2006/0218625 A1 | 9/2006 | Pearson et al. | |
| 2007/0022469 A1* | 1/2007 | Cooper | H04K 1/00 726/3 |
| 2007/0099634 A1 | 5/2007 | Chari | |
| 2007/0184822 A1* | 8/2007 | Huotari | H04W 4/20 455/415 |
| 2008/0070571 A1* | 3/2008 | Nguyen et al. | 455/435.1 |
| 2008/0168124 A1* | 7/2008 | Lee | H04N 21/242 709/201 |
| 2009/0064300 A1* | 3/2009 | Bagepalli | H04L 63/02 726/7 |
| 2009/0067410 A1* | 3/2009 | Sterman | H04L 29/06027 370/352 |
| 2010/0049790 A1* | 2/2010 | Schreiber | G06Q 30/0273 709/203 |
| 2010/0054142 A1* | 3/2010 | Moiso et al. | 370/252 |
| 2010/0100945 A1* | 4/2010 | Ozzie et al. | 726/5 |
| 2010/0110956 A1* | 5/2010 | Hepworth et al. | 370/312 |
| 2010/0130239 A1* | 5/2010 | Shaw | H04L 51/14 455/466 |
| 2010/0268778 A1* | 10/2010 | Kim et al. | 709/204 |

\* cited by examiner

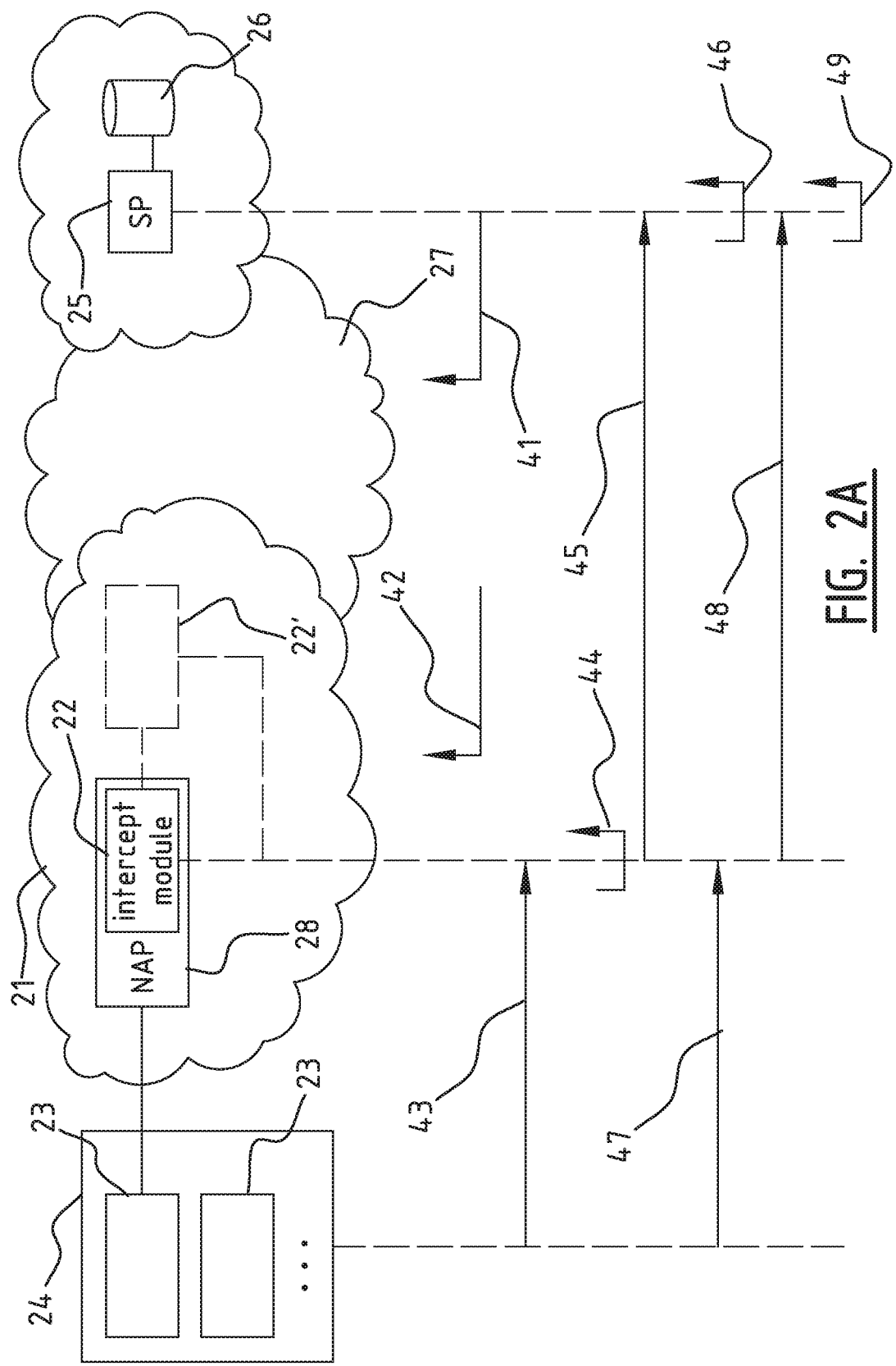

METHOD FOR VERIFYING A USER ASSOCIATION, INTERCEPTING MODULE AND NETWORK NODE ELEMENT

FIELD OF THE INVENTION

The present invention relates to a method for verifying an association between a user (or subscriber) and a group of users (or subscribers) sharing a common subscription, such as users sharing a household or a business location. The invention also relates to a module intended for intercepting messages. The invention further relates to a node element, such as a router or an access device or a server, comprising such a module.

BACKGROUND

Today, services and applications selling commercial media content to consumers have no means to reliably authenticate the concept of "household", or to reliably authenticate a "business location".

A practice deployed today is for the service provider to define one main or primary subscriber on an account or subscription and allow this subscriber to add more users to this account or subscription. The account/subscription can then be considered as representing a household domain.

SUMMARY

The object of the present invention is to provide a method to efficiently verify the association between a user and a group of users sharing a common subscription, such as users sharing a household or a business location. Another object is to provide an interception module of messages for use in an access network.

It is noted that the term access network has to be interpreted in the broad sense and is that part of a communications network that connects subscribers to their immediate service provider. This can be any access network, including an aggregation access network, or an Internet Service Provider (ISP) infrastructure.

The term "household" as used in the description of the present invention refers typically to a group of persons residing in the same dwelling or to any similar situation. The term "business location" refers to any business related location where a number of authorized users share an account or to any similar situation.

According to an embodiment of the method of the invention, the method comprises:
  intercepting a message between a user and a service provider, typically in an access network;
  adapting the message with information to include a guarantee to the service provider that the message is sent from a location allowed by the common subscription.

According to a possible embodiment of the invention the group of users share a common location, and the guarantee is a guarantee to the service provider that the message is sent from the common location. A service provider is then able to make sure that all users of an account are at the same common location, e.g. live in the same dwelling or constitute the work force of a business location.

According to a preferred embodiment the intercepted messages are signalling messages, in particular application layer signalling messages. Typically the signalling messages can be but are not limited to application layer messages over IP, such as Hypertext Transfer Protocol (HTTP), HTTP Secure (HTTPS), Session Initiation Protocol (SIP), Real-time Transport Protocol (RTP), Real Time Streaming Protocol (RTSP), RTP Control Protocol (RTCP), etc.

According to an embodiment such a method will typically enable media service providers to reliably verify the association between users (or subscribers) and households or business locations in application signalling and optionally to verify that the received information is authentic. This method is easy to deploy and scalable.

According to a preferred embodiment of the invention, including a guarantee to the service provider that the message is sent from the common location comprises including a household/business location identification.

According to a first exemplary embodiment, the message is intercepted in a fixed access network, and adapted to include an identification of the household/business location. In a DSL access network the household/business location identification will for instance be a DSL line identification and the network node element responsible for including the household/business location identification can for instance be a Digital Subscriber Line Access Multiplexer (DSLAM) or a Broadband Remote Access server (BRAS). In optical access networks and Hybrid Fibre Coax (HFC) access networks there typically exists a network node that holds information that uniquely identifies households/business locations, and which is able to univocally discriminate signalling messages coming from these households/business locations. Such a node can be adapted for including said household/business location information in said signalling messages, according to an embodiment of the method of the present invention. In optical access networks this network node will for instance be an optical line termination (OLT) and in HFC access networks this network node will for instance be a Cable Modem Termination System (CMTS). The household/business location identification can for instance be an identifier identifying the household and inserted in each data packet in HFC access networks or an identifier identifying the household such as a Passive Optical Network identifier (PON ID) in optical access networks.

According to a second exemplary embodiment the message is intercepted in a mobile or wireless access network and the information consists in an identification of a mobile or wireless subscriber. In this embodiment the main subscriber will typically first register all the users of the group sharing a common subscription with the service provider, so that the service provider can be guaranteed that the user is allowed to use the services provided by the common subscription. In this case the users sharing a common subscription may be allowed to send messages from a plurality of locations.

According to a third exemplary embodiment the message is intercepted in a mobile or wireless access network with a fixed access line, and adapted to include an identification of the fixed access line. The common location can be at least in part connected to an access network via e.g. a femto cell infrastructure using a fixed access line, and the adaption consists in including an identification of said fixed access line. However, it is also possible that the traffic from femto to mobile access provider traverses the DSL network transparently in a secure pipe (encrypted) wherein the DSL access network does not intercept and adapt, but it will then be the mobile provider that does it exactly as it is described in the second exemplary embodiment above.

According to a preferred embodiment of the method of the invention, the adapting comprises including the information in the message and using an authentication mechanism to authenticate it. The adapting can for example comprise including the information in a message and signing at least part of the message, in particular using a technique based on certificates.

According to a possible embodiment the adapting of the message comprises adding meta data with the information to the message. Other possible embodiments are described below in the examples.

According to a further aspect of the invention, an access network has access to a list with certain service providers, and an incoming message is adapted if the involved service provider which can be derived from the incoming message is on the list.

According to an embodiment the intercepting module, in particular for placement between a user of a group of users sharing a common subscription and a service provider, typically in an access network, is adapted for:
  intercepting a message, typically a signalling message;
  adapting the message with information to include a guarantee to the service provider that the message was sent from a location allowed by the common subscription.

According to a preferred embodiment the group of users share a common location, and the module is adapted to include a unique identification of the common location, and in particular a household or business location identification.

According to a possible embodiment, the module is designed for adapting the message by including the information and signing it.

According to a further aspect the module may be further adapted:
  to derive an involved service provider from an incoming message;
  to verify whether this service provider is on a list of service providers, and to adapt the incoming message only if the service provider is on said list.

Finally the invention relates to a network node element comprising an intercepting module as disclosed above. This can be a network access device, such as a DSLAM or BRAS, or alternatively this can be an edge router in an access aggregation network, or a router or server in an ISP infrastructure or a network node element in a cable access network, such as a CMTS, or a network node element in an optical fibre access network, such as an OLT, or a network node element in a mobile access network such as, e.g., an SGSN in a 3G network, or a network node element in a 4G mobile access network or subsequent mobile generations, or a network node element in a wireless access network such as, e.g., an access router or access controller or service router or edge router node in a WiMax access network, etc. The list of network nodes is for the purpose of illustration and is not limitative: the function may be supported by any other suitable network node in an access network.

BRIEF DESCRIPTION OF THE FIGURES

The accompanying drawings are used to illustrate presently preferred non-limiting exemplary embodiments of the present invention. The above and other advantages, features and objects of the invention will become more apparent, and the invention will be better understood from the following detailed description when read in conjunction with the accompanying drawings, in which:

FIG. 2A is a schematic view of an infrastructure implementing a fixed access embodiment of the method of the invention;

DETAILED DESCRIPTION

Figure 1:
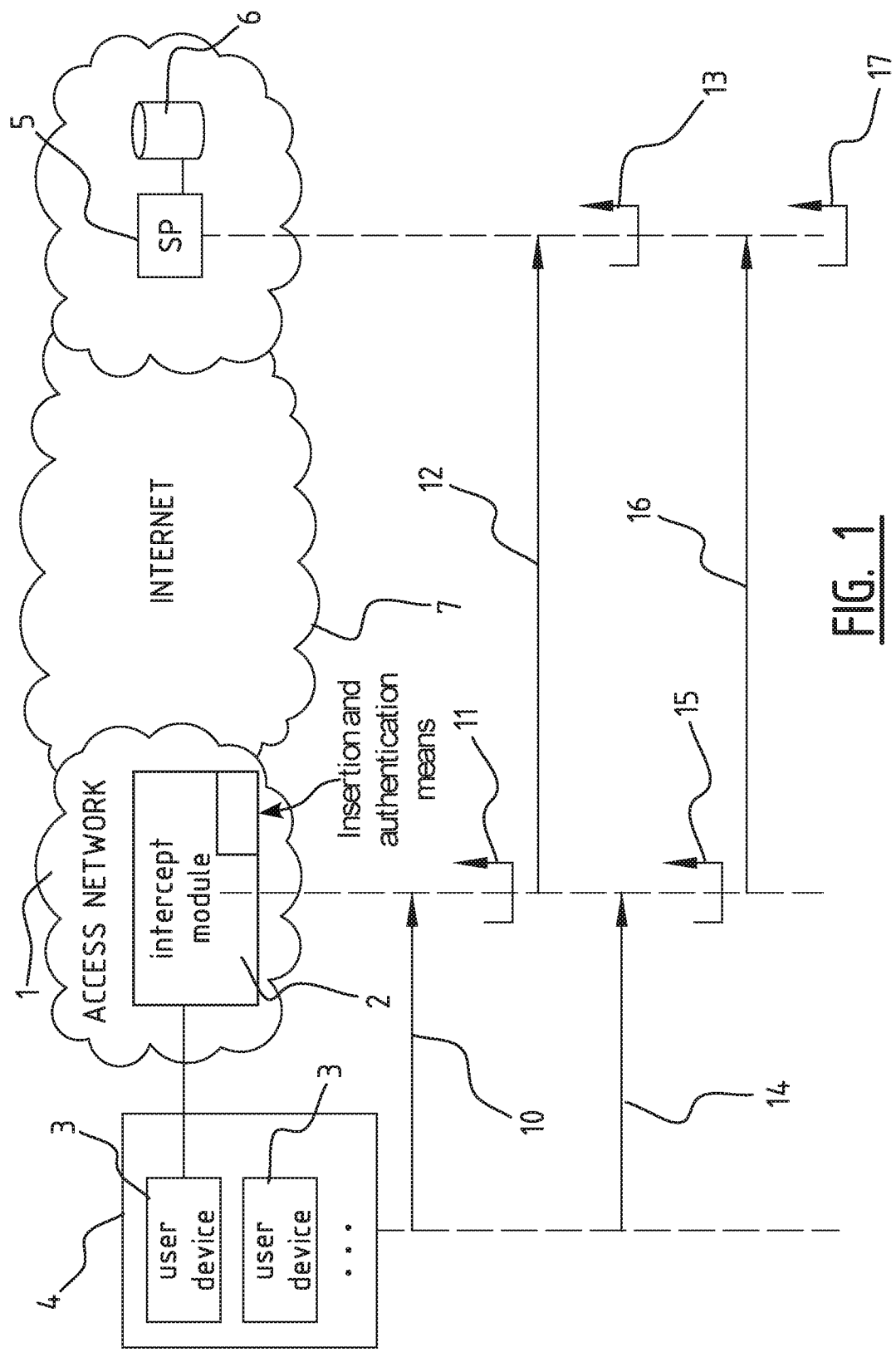
FIG. 1 is a schematic view of an infrastructure implementing a general embodiment of the method of the invention.

In the embodiment of FIG. 1 the access network 1 includes a module 2 that is able to intercept, observe and adapt the signalling between a household 4 with a number of users 3 and a service provider 5, on a specific access technology. Note that the household 4 could also be a business location.

The module 2 is provided with a means to add an identification of the household 4 and to sign this information, or to sign part or all of the signalling message that is sent to the service provider. When the module 2 intercepts signalling, see arrows 10 and 11, the signalling will be adapted by the module 2.

When the service provider 5 receives a signed signalling message 12 from the access network, it verifies the signature and stores the identification information in association with subscriber data in a subscriber data base 6, see arrow 13. When a following signalling message 14 is sent from the household 4, the signalling is augmented and signed by the module 2 and forwarded to the service provider, see arrow 16. The service provider will then verify the data according to the database 6, see arrow 17.

EXAMPLE A

Example A described below with reference to FIG. 2A is based on DSL technology, but similar infrastructures are available in other access technologies in which similar mechanisms can be deployed—see examples B and C below. In a DSL access network there is a network access node 28, typically a DSLAM (Digital Subscriber Line Access Module) which can include the module 22 that can intercept the application layer signalling between a household 24 and a specific service provider 25. Note that it is also possible to provide the module 22' in (a) different node(s), e.g. a BRAS. In this embodiment the access network 21 is implemented with a means to identify itself and to sign signalling messages that are sent to the service provider 25.

For example, the type of signalling used may be the HTTP protocol, so that it is simple to recognise it and intercept it. However, the signalling that can be intercepted and modified can be any type of signalling over IP, which can be, but is not limited to, HTTP, HTTPS, SIP, RTP, RTSP, RTCP, etc.

According to a possible embodiment, node 28 now first analyses the signalling and recognises signalling that pertains to media service providers that need the function of the invention. This mechanism is a very valuable feature and so the access network could be remunerated for it, which means it will not perform the function if it is not paid or compensated for it. Alternatively the access network performs this function as part of a (remunerated) service level agreement (SLA). In this embodiment the access network has a list of service providers that are paying or have an agreement to have this function activated on the signalling of their customers. The way the business relationship is established between the access network and service provider is outside of the scope of this patent and may for example be performed using well-known techniques. When the business relationship is being established between the access network and the service provider, the latter should typically provide the former with information to help it distinguish signalling, such as HTTP signalling, that pertains to its own business.

This information can be, e.g., the name of an Internet domain such as is used in DNS, for example: http://service-provider-domain-name/. According to a possible embodiment the service provider will populate domain name(s) to the access network, see step 41 in FIG. 2A.

Because it may be cumbersome for access networks and service providers to establish a large number of such business relationships this function can also be performed by an intermediary third party entity or player that is responsible for establishing a large number of such business relationships between entities, e.g., between access network and service provider.

When node 28 intercepts signalling (such as HTTP signalling) that contains an identifier (e.g. a "service-provider-domain-name") that identifies a service provider for which signalling messages have to be intercepted, then the module 22 will include additional information to this signalling message in a way that is compliant with the usage of this particular signalling, see arrows 43 and 44 in FIG. 2A. However, note that it is also possible to intercept all signalling without verifying the service provider details. Examples for including additional information to such a message are:

add (append) an element of information, and in particular append additional meta-data to the signalling message; the meta-data that is added by node 28 will typically identify the household of the particular user emitting this signalling or the business location of the business workforce member;

replace an element of information included in the message by another;

insert an element of information that is missing/add the information in an empty field in the message.

The information to be manipulated inside the signalling message can use any type of formatting such as e.g. XML. The information exchange can be based on or use: HTTP, XML, SOAP, REST, etc. The additional information will typically include an identification of the household or the business location.

In the case of a DSL network this identification information can be the so-called "LineId" or line identification. This type of data may have a specific, possibly universal, format, which may be described in the standard. However, the method also works if the format is specific to the access network. The access network is preferably consistent in its use of this data format and sufficiently universal, i.e. contains e.g. a unique identifier of the access network together with an identifier unique in the context of this access network. The LineId itself may be composed of a number of information elements which usually relate to the deployed physical infrastructures, such as the DSLAMs, helping to identify a DSLAM, a card in the DSLAM, and a Line, i.e. the unique identification of the physical twisted pair. The LineId can further help to identify the physical (geographical) location of the DSL line, which can be very helpful to the Service Provider as it enables the service provider to support the so-called "Geoblocking" feature. This feature makes it possible for the Service Provider to grant, or not, using the same mechanism, access to services, resources, and content (e.g. media content such as a movie), depending on the requesting user's location, e.g., on a country-by-country basis.

In order for the household identification to be guaranteed as authentic, the module 22 will sign the data, also performed in step 44 in FIG. 2A. This signing can be performed by adding a signature of part or all of the data, such as a so-called fingerprint, using a certificate, for example using well-known techniques such as X.509 certificates. These X.509 certificates are part of a so-called Public Key Infrastructure (PKI) and are distributed to access networks by well-known, established and trusted third parties called CAs (Certification Authorities), see also arrow 42 in FIG. 2A. Since the certificate is part of a PKI it can be verified by the service provider, which consequently can verify that the household identification is authentic.

Note that other authentication mechanisms may also be used such as:

mechanisms in use in "reputation networks": the identity of the DSLAM is endorsed based on its reputation "score"; this reputation score is established in a collaborative manner by other nodes in the network (in an automated way); the reputation score gives an idea of the level of trust the Service Provider can have in the information provided by the said access node (DLSAM);

identity assertion: these are aggregates of data that together help assert an identity; in this case multiple elements of information provided by the DSLAM help assert the DSLAM's identity;

independent trusted third parties can provide the mechanisms described above such as the reputation score or the identity assertion.

When the service provider receives a signed signalling message from the access network, it verifies the signature and stores the identification data in association with subscriber data in a subscriber data base 26, see arrow 46. When a following signalling message 47 is sent from the household 24, the signalling is augmented and signed by the module 22 and forwarded to the service provider, see arrow 48. The service provider will then verify the data according to the database 26, see arrow 49.

The identification can be added as signalling meta-data as soon as the first signalling exchanges take place between a subscriber 23 and a service provider 25. This way the service provider will associate the subscriber with said identification data. Later-on the subscriber will create other users 23 with additional signalling. This signalling will also include the identification and so the service provider 25 is also able to associate these users with the identification. This way the service provider is always able to verify that subscriber and users are all part of the same so-called "household", i.e., that they live under the same roof and use the same access network.

It is possible that several Network Access Points (NAPs) are associated with the same household, for example if they use different network access technologies at the same time. In such a case, the subscriber can start its subscription with a specific NAP called the main NAP, and later-on can add NAPs in its subscription profile. The service provider is then able to associate several NAPs with this subscriber and its users, and also associate the related identifications. The service provider can apply rules in order to determine whether additional NAPs are allowed or not, and this in order to, on one hand, provide enough flexibility to its legitimate users, but, on the other hand, also to prevent fraud when users attempt deceptive actions.

EXAMPLE B

Figure 2B:
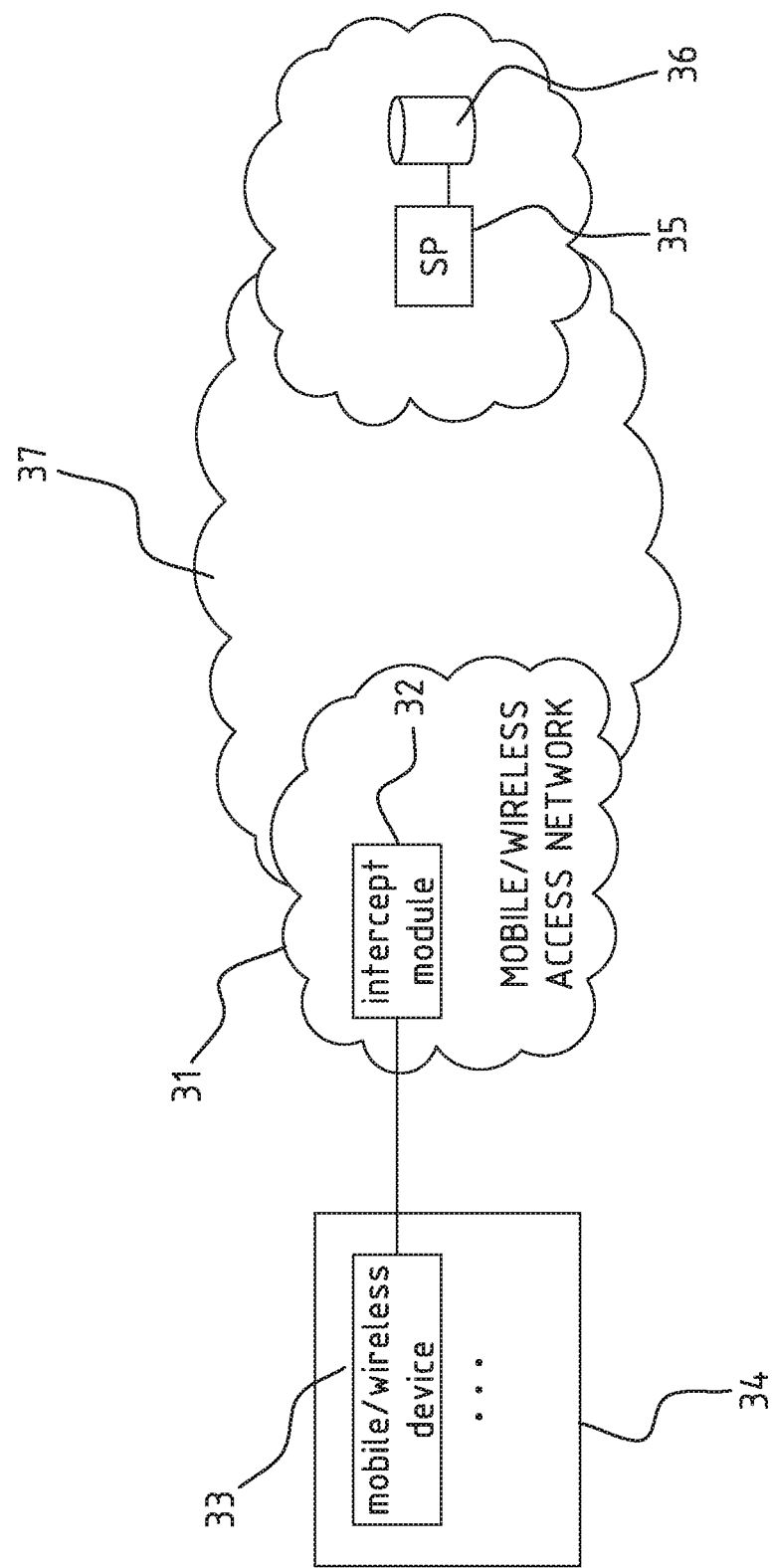
FIG. 2B is a schematic view of an infrastructure implementing a wireless or mobile access embodiment of the method of the invention.

Example B relates to the case of mobile technologies, such as 2G, 2.5G, 3G, 4G (LTE) and wireless technologies, such as Wi-Fi or WiMax, and is illustrated with reference to FIG. 2B.

If a user in the household 34 wants to access the service provider with a mobile handset 33 using mobile technology, or wireless device 33 using wireless technologies such as Wi-Fi or WiMax, or any similar device using a similar technology, then there is no NAP concept in these network access technologies. However, most of these mobile or wireless technologies come with strong authentication methods that allow to reliably identify mobile subscribers (users).

When intercepting the signalling messages in an intercept module 32 in a mobile or wireless access network 31, there can be added a guarantee to the service provider that the message is sent from a particular mobile subscriber (user). For the mobile subscriber (user) to be granted access to the services, resources, and content of the service provider as a user of a household, the household's main subscriber will typically have to register that mobile subscriber (user) with the service provider beforehand. This explicit registration of mobile users will then allow the service provider to verify that the users are not attempting any deceptive actions.

To adapt the signalling message the intercept module 32 can for example use an "append/include" mechanism similar to the fixed line case. In the mobile access case the appended/included information is for example the identity of the mobile subscriber (user) as registered with the service provider by the household's main subscriber.

The way to authenticate the appended information can also be similar to the examples described above (X.509 certificates, reputation networks, identity assertion, and trusted third party).

A difference in the wireless/mobile cases is that the mobile/wireless technology usually provides a means to allow for a strong authentication of the mobile/wireless user/subscriber/device to compensate for the inherent insecurity of the air interface:

- in mobile technology the SIM card can be used (e.g. 2G, 2.5G),
- in 3G/UMTS, 4G, LTE, the USIM can be used, together with protocols such as AKA (Authentication and Key Agreement);
- with IMS application domain the ISIM can be used; further a modified version of AKA, called SIP-Digest-AKA can be used;
- in wireless technology such as WiMax or Wi-Fi strong authentication typically is provided by the access network provider, using e.g. X.802.11 protocol series in Wi-Fi and X.802.16 and Extended Authentication Protocol (EAP) in WiMax.

In the cases above a unique client downloaded on a wireless device, enabling to authenticate that device can also be used (such as, e.g., a "Soft ISIM"). As an alternative or in addition thereto, the technologies above can use certificates to authenticate the wireless/mobile device.

Note that the examples above are not limitative. The skilled person will understand that other ways exist to ensure that the wireless network access provider can establish the mobile/wireless user/subscriber/device identity. Once this is done, there is a node 32 in the mobile/wireless network access provider's network that is able to intercept and modify signalling as described in example A (e.g. append information and authenticate that information).

Other mechanisms that can be used to establish and exchange identities in mobile communication technologies are e.g. GAA/GBA (Generic Authentication Architecture/Generic Bootstrap Authentication), mechanisms defined by Liberty Alliance, etc.

If a mobile/wireless device needs to be associated with a household then the household main/primary subscriber can for example associate them explicitly using a registration method. In the case of mobile networks, one way of achieving this, is for the household primary subscriber to perform this action together with the mobile user when the mobile user is in the home, such that the necessary data additions can be performed by the network access providers, such that the necessary data correlations can be performed by the service provider to perform the necessary identifiers associations and prevent fraud. A convenient way to perform this is to use a femto cell infrastructure in the home, when available, because then there exist an association between the mobile signalling and the fixed access line used by the femto to carry its data and so the access network is able to verify that the association exists and is valid. However, in the absence of a femto cell, data correlations can be performed just as well.

EXAMPLE C

Example C relates to an embodiment where a cable (e.g. HFC) type or an optical (e.g. fibre) type of access network is used. This embodiment is similar to example A. The name of the involved access nodes will typically be different but the fundamental signalling interception and modification mechanisms will be similar. The infrastructure of a cable and fibre access network is essentially shared by different users, and this including the so-called first mile. However, there will typically be one node that holds a unique identification of the common location, typically a household identification. The type of information to be added to identify the common location will typically be different (different format and content), but the principle remains the same: enabling a unique identification of a household. Examples of such an identification are

- in optical access networks: a household identification as known by an Optical Line Termination (OLT);
- in HFC access networks: a household identification as known by a Cable Modem Termination System (CMTS).

The node holding the identification is typically able to discriminate between the signalling from different households using techniques that are specific and well-known by the skilled person familiar with these access technologies, e.g. a discrimination based on an identifier present in each data packet. According to an embodiment of the invention the household signalling will be adapted to include its corresponding household identification.

The type of "signature" or authentication information to be added to authenticate the provided information can for example be the same, as described above (X.509 certificates, reputation networks, identity assertion, trusted third party).

The embodiments of the method of the invention described above with reference to the figures all have the advantage that they are very powerful and scalable because there is no need for detailed exchange of information about subscribers and users via separate channels between access networks and service providers because the access network will add the additional information in any signalling that requires it, and this data reaches the service provider, whom in turn is able to process this data as the service provider typically holds detailed records of its own subscribers and users and their related data.

The method and module of the invention can for instance be used by media service providers and all implied access networks. A useful feature is provided that enables operators to leverage their access infrastructure. Further media service providers and movie studios may use the invention in the form of an additional lightweight security in the end-to-end media distribution solution.

While the principles of the invention have been set out above in connection with specific embodiments, it is to be clearly understood that this description is merely made by way of example and not as a limitation of the scope of protection which is determined by the appended claims.

The invention claimed is:

1. A method for verifying an association between a user device and a group of user devices sharing a common subscription, the method comprising the steps of:
   intercepting, via an access device located in an access network, an application layer signaling message sent from the user device to an immediate service provider, wherein the application layer signaling message contains an identifier of a specific service provider for which signaling messages can be intercepted, and wherein the application layer signaling message comprises at least one of a Session Initiation Protocol (SIP), a Real-time Transport Protocol (RTP), a Real Time Streaming Protocol (RTSP) or a RTP Control Protocol (RTCP); and
   adapting, via the access device, the at least one of the SIP, RTP, RTSP or RTCP application layer signaling message with information and a line identification to include a guarantee to the immediate service provider that the at least one of the SIP, RTP, RTSP or RTCP application layer signaling message is sent from a location allowed by the common subscription, wherein the location allowed by the common subscription comprises a dwelling or a business location that has a unique identification, and wherein the line identification relates to deployed physical infrastructures in the access network; and
   wherein the access network is a part of a communications network that connects the user device to the immediate service provider.

2. The method of claim 1, wherein the group of user devices share a common location, and the guarantee is a guarantee to the immediate service provider that the application layer signaling message is sent from the common location.

3. The method of claim 1, wherein the application layer signaling message is intercepted in a fixed access network, and adapted to include an identification of the common location.

4. The method of claim 1, wherein the application layer signaling message is intercepted in a mobile or a wireless access network, and wherein the application layer signaling message is adapted to include an identification of a mobile or wireless user device of the group.

5. The method of claim 1, wherein the application layer signaling message is intercepted in a mobile or a wireless access network with a fixed access line, and wherein the application layer signaling message is adapted to include an identification of the fixed access line.

6. The method of claim 1, wherein the adapting step further comprises the steps of:
   including the information in the application layer signaling message; and
   using an authentication mechanism to authenticate at least part of the application layer signaling message.

7. The method of claim 1, wherein the adapting step further comprises the steps of:
   including the information in the application layer signaling message; and
   signing at least part of the message using a technique based on certificates.

8. The method of claim 1, wherein the access network has access to a list with certain service providers, and wherein an incoming message is adapted when an involved service provider derived from the incoming message is part of the list.

9. The method of claim 1, wherein the dwelling or the business location is shared by a group of users.

10. The method of claim 1, wherein the identifier of the specific service provider is a domain name.

11. The method of claim 1, further comprising discriminating, via the access device, between incoming signaling messages from different common locations.

12. A method for verifying an association between a user device and a group of user devices sharing a common subscription, the method comprising the steps of:
   intercepting, via an access device located in an access network, at least one of a Session Initiation Protocol (SIP), a Real-time Transport Protocol (RTP), a Real Time Streaming Protocol (RTSP) or a RTP Control Protocol (RTCP) application layer signaling message sent from the user device to an immediate service provider, wherein the at least one of the SIP, RTP, RTSP or RTCP application layer signaling message contains an identifier of a specific service provider for which signaling messages can be intercepted; and
   adapting, via the access device, the at least one of the SIP, RTP, RTSP or RTCP application layer signaling message with information and a line identification to include a guarantee to the immediate service provider that the at least one of the SIP, RTP, RTSP or RTCP application layer signaling message is sent from a location allowed by the common subscription, wherein the location allowed by the common subscription comprises a dwelling or a business location that has a unique identification, and wherein the line identification relates to deployed physical infrastructures in the access network; and
   wherein the access network is a part of a communications network that connects the user device to the immediate service provider.

* * * * *